United States Patent [19]

Nee et al.

[11] Patent Number: 4,730,388
[45] Date of Patent: Mar. 15, 1988

[54] REPLACEMENT OF SPLIT-PIN ASSEMBLIES IN NUCLEAR REACTOR

[75] Inventors: John D. Nee, Levelgreen, Pa.; Richard A. Green, Farmington Hills, Mich.

[73] Assignee: Westinghouse Electric Corp., Pittsburgh, Pa.

[21] Appl. No.: 936,950

[22] Filed: Dec. 1, 1986

Related U.S. Application Data

[63] Continuation of Ser. No. 617,854, Jun. 6, 1984, abandoned.

[51] Int. Cl.$^4$ .................... B23Q 7/10; B25S 11/00; B66C 23/00
[52] U.S. Cl. ................... 29/809; 29/402.08; 414/744 A; 901/17
[58] Field of Search ............... 29/402.08, 407, 795, 29/809, 70 L; 901/17; 414/744 A, 751

[56] References Cited

U.S. PATENT DOCUMENTS

| | | | |
|---|---|---|---|
| 4,098,088 | 7/1978 | Mason | 901/17 |
| 4,196,049 | 4/1980 | Burns et al. | 901/17 |
| 4,299,529 | 11/1981 | Inaba et al. | 414/744 A |
| 4,411,576 | 10/1983 | Smith et al. | 414/744 A |

*Primary Examiner*—Howard N. Goldberg
*Assistant Examiner*—Irene Graves Golab

[57] ABSTRACT

A pick-and-put tool, new-nut hopper and pin-insertion/torque tool for completing the installation of the new split-pin assembly in a lower guide tube under water after the old split-pin assembly has been severed into fragments. One fragment, located in the upper counterbore of the LGT, includes a portion of the old nut and the portion of the pin on which it is threaded. The pick-and-put tool includes a clamp and hydraulic cylinders for moving the clamp between a home position and an advanced position and for pivoting the clamp in each position. There is also a cylinder for raising or lowering the clamp in each position. The pick-and-put tool has stops which stop the movement of the clamp precisely in the home position or the advanced position and in their pivoted positions. The pick-and-put tool is mounted in the pool such that it can properly align with both the LGT and hopper. The clamp is first moved from the home position to the advanced position. In this position the clamp is precisely set by a stop to be pivoted into engagement with the LGT thus locating the jaws of the clamp about the fragment. After the clamp engages the fragment it is raised, raising the fragment from its counterbore in the LGT and clearing the LGT. The clamp is then returned to the home position where it is lowered and the fragment is released into a trash chute. After the upper counterbore is cleaned, the clamp is pivoted and precisely stopped so that it engages a new nut in the hopper. The clamp is raised then and is moved to the advanced position and then pivoted over the counterbore. The new nut is deposited in the counterbore.

8 Claims, 15 Drawing Figures

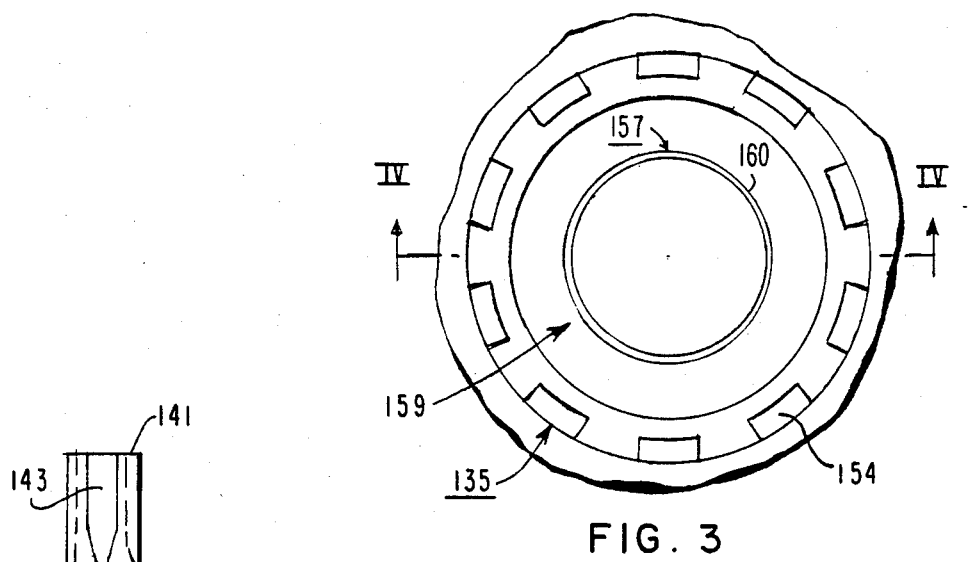
FIG. 3
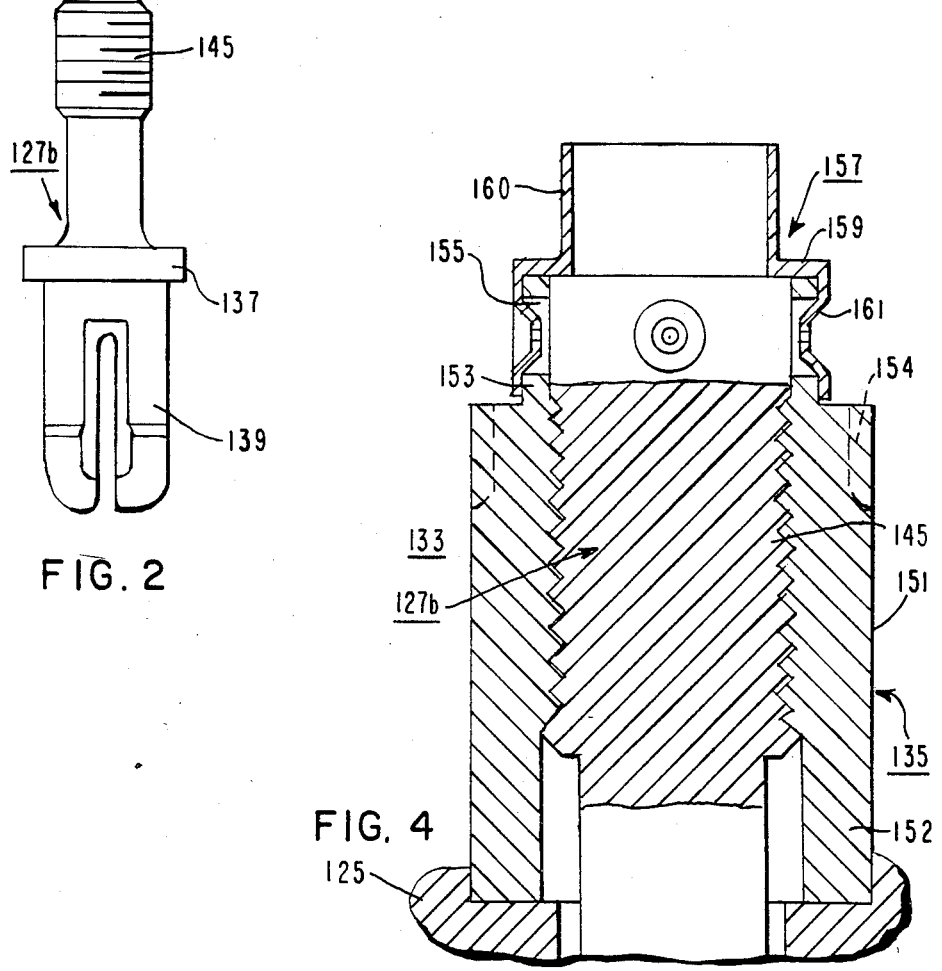
FIG. 2
FIG. 4

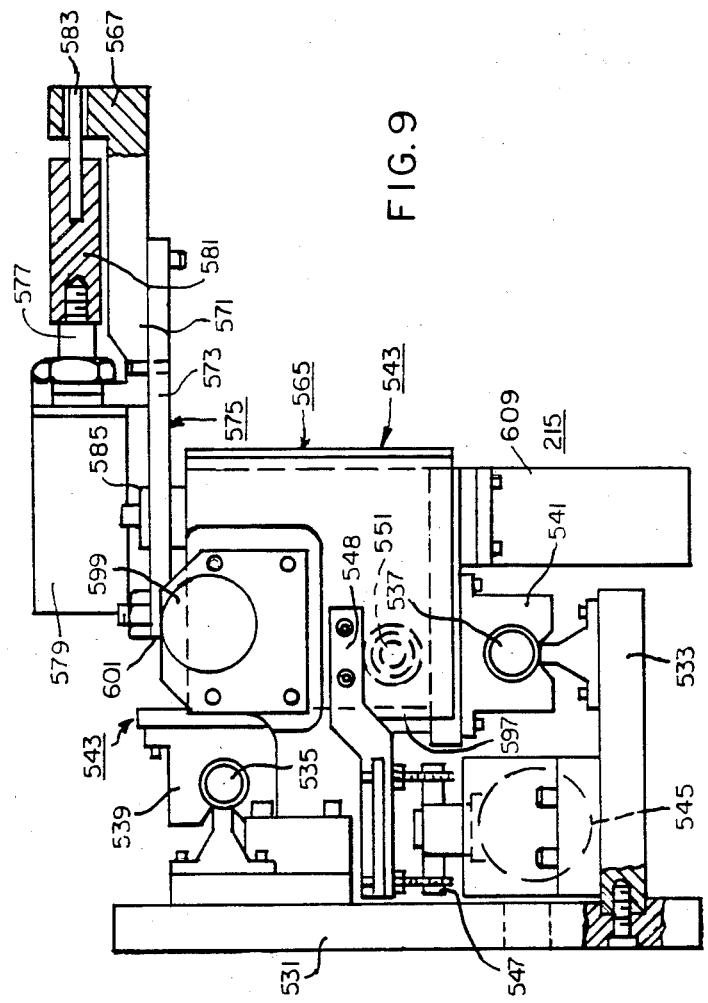

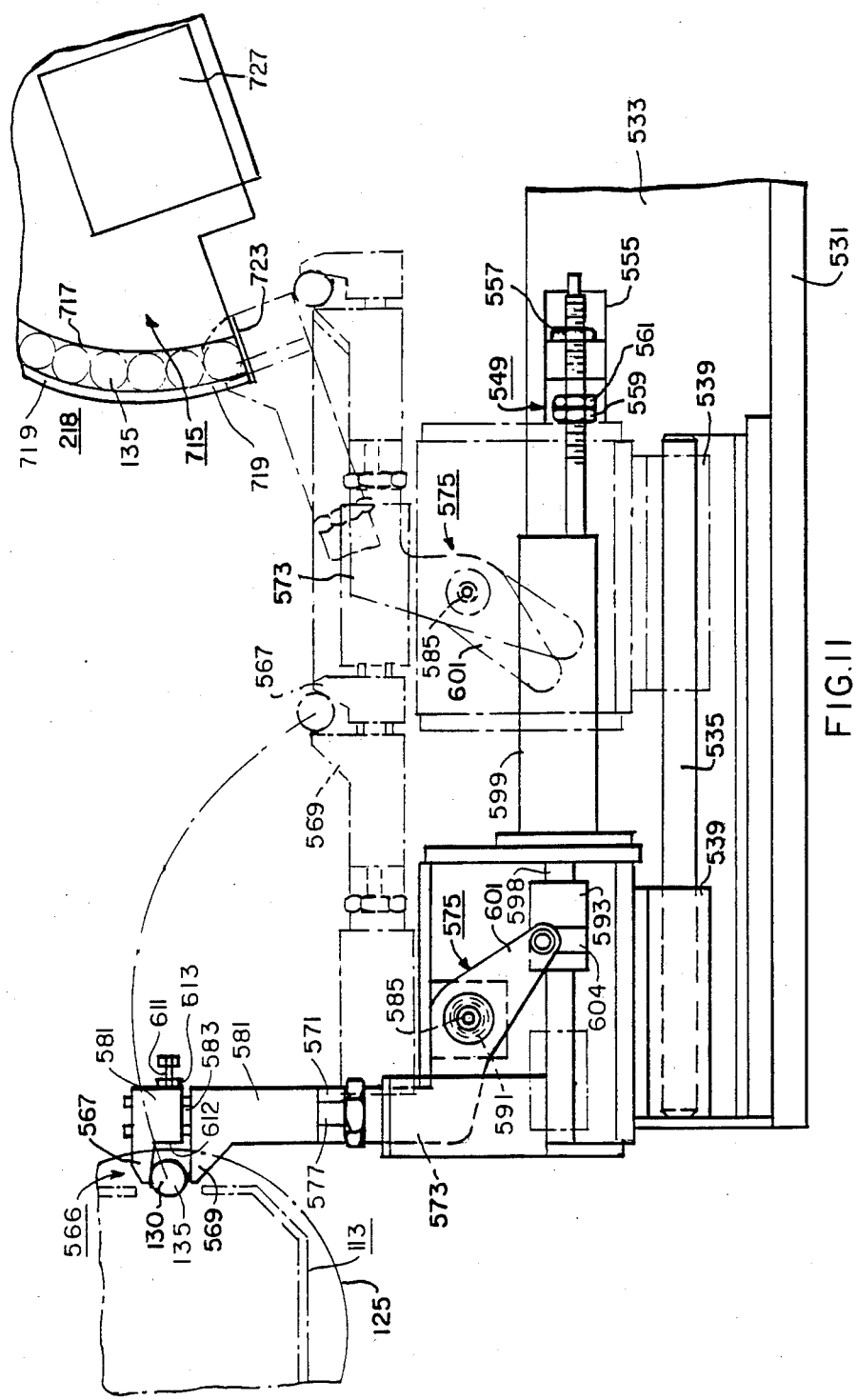

REPLACEMENT OF SPLIT-PIN ASSEMBLIES IN NUCLEAR REACTOR

This application is a continuation of application Ser. No. 617,854 filed June 6, 1984, now abandoned.

REFERENCE TO RELATED APPLICATION

Application Ser. No. 617,857 filed concurrently herewith to Raymond F. Calfo, George F. Dailey and Raymond P. Castner for REPLACEMENT OF SPLIT PINS IN GUIDE TUBES (herein Calfo), assigned to Westinghouse Electric Corporation, is incorporated herein by reference.

BACKGROUND OF THE INVENTION

This invention relates to nuclear reactors and has particular relationship to the replacement of old split-pin assemblies of a guide tube of a nuclear reactor with new split-pin assemblies. According to the teachings of Calfo the old split-pin assembly, secured in the upper and lower counterbores of the lower circular flange of the lower guide tube (LGT) of the reactor, is processed in a pool of borated water in a work station which includes a plurality of robotic tools. Each guide tube is equipped with two split-pin assemblies located in the lower flange 180° apart. The LGT is precisely positioned by a clamp-and-index tool. The old split-pin assembly is then severed by a metal-disintegration machine tool predominantly into two fragments; one fragment (herein referred to as the "nut fragment") consists of the residual part of the old nut and part of the old split pin threaded to it, and the other consists of the residual part of the split pin. The latter is extracted from the lower counterbore of the flange and deposited in a trash chute by a pin puller and expeller on the clamp-and-index tool. At this point it becomes necessary to remove the nut fragment from the upper counterbore of the flange and then to secure the new split-pin assembly in this flange. A difficulty which is imposed in carrying out this phase of the replacement is that the new nut is only partially accessible for mechanical processing. The nut extends from the upper counterbore into a slot in a wall of the LGT which has the shape of, and is referred to as, a "mousehole". Only a limited area external to the "mousehole" is accessible for removal of the nut fragment and for insertion in the upper counterbore of a new nut and threading it to a new pin. In addition, the tines (or leaves) of the pins must be properly aligned with respect to the top flange of the guide tube. This invention concerns itself with the phase of the overall replacement operation involving the removal of the old nut fragment and its replacement by a new nut in the flange of the LGT.

It is an object of this invention to provide apparatus for removing the nut fragments from the upper counterbore of the flange, and, after the upper and lower counterbores have been cleaned, to replace the old nut fragment by a new nut in the flange without damage to the LGT.

The replacement is carried out in two stages. In the first stage the nut fragment is removed from the upper counterbore and is replaced by a new nut. The conditions imposed on the tooling and the practice for accomplishing this purpose is as follows:

1. It must be capable of operation within the space confines imposed by, and in cooperation with, the other tooling in the robotic work station.
2. It must be capable of operation in the limited space available external to the "mousehole".
3. There must be accessibility for supplying new nuts from the deck above the pool.
4. The tooling and practice must be capable of operation, when coupled with a programmable computer, in an automatic mode.
5. The tooling must be capable of operating in borated water.

In the second stage the new split pin is inserted in the new nut and the new split-pin assembly is secured to the flange by threading and properly torquing the new nut onto a new split pin. This invention concerns itself only with the first stage.

It is an object of this invention to provide tooling which shall meet the above conditions for removing the nut fragment and installing new split-pin assemblies in the lower flange of a LGT of a reactor without damage to the LGT.

SUMMARY OF THE INVENTION

In accordance with this invention there is provided a hopper for new nuts, a pick-and-put tool. These tools are affixed to a strongback assembly which is mounted against the wall of the pool such that the guide tube is kept underwater during processing of the split pin assemblies. The pick-and-put tool is located on the strongback at a vertical location such that it can be positioned horizontally to perform operations at both the guide tube flange and at the nut hopper. The LGT can be rotated back and forth through 180° so that the severing, fragment removal, cleaning, and nut replacing operations can be coordinated in the limited space available. The severence and brushing take place in the 0° position of the LGT; the nut fragment removal and nut replacement in the 180° position. The sequence is as follows:

0° position—sever old split-pin assembly and dispose of pin fragment,
180° position—remove and dispose of nut fragment,
0° position—clean counterbores,
180° position—insert new nut,
180° position—insert new pin, torque nut to pin.

The hopper includes a plate having in its top a curved groove, typically in the form of a circular arc extending over about 270°. The groove constitutes a magazine for the new nuts and includes a loading port near one end and a stop near the other end. The stop locates the nut for pick up by the pick-and-put tool. The hopper includes a double-acting hydraulic rotary cylinder (ROTAC) which rotates an arm extending over the groove. A funnel is provided above the loading port and it serves as a temporary mount for a long tube extending from the deck. A new nut is dropped into the tube which guides it to the loading port. Once the nut is in the loading port, the rotary cylinder is activated and swings from its "home" position behind the inserted nut, thus pushing it around the groove towards the stop. The swing arm is then swung back to its "home" position and the procedure repeated until the nut hopper is filled (typically with 26 nuts). The elevation of the hopper is such that a nut removed from the unloading port by the pick-and-put tool is at the proper level for insertion in the upper counterbore of the LGT.

The pick-and-put tool includes a clamp and a plurality of hydraulic cylinders for moving the clamp in three degrees of motion; i.e., vertically and in any selected direction horizontally. Its function is to remove and dispose of the old nut fragment and remove a new nut from the hopper and insert it in the upper counterbore.

In removing the old nut fragment the pick-and-put tool performs the following operation after the LGT is rotated 180° from the old-split-pin-assembly severence position:

1. Moves inwardly toward the guide tube from its "home" (storage) position to an advanced position where it is stopped by a preset stop.
2. Rotates typically approximately 90° to position the jaws of the clamp about the old nut fragment. An adjustable stop, which acts against the guide tube flange, is provided to assure that the jaws are properly positioned with respect to the nut.
3. Clamps the old nut fragment.
4. Lifts the fragment from the upper counterbore.
5. Rotates back to the advanced position, typically about 90° (reverse of step 2).
6. Moves back to its "home" position (reverse of Step 1). This motion is also arrested by an adjustable stop which is preset to locate the nut directly over a trash chute which guides the nut fragment to a disposal basket; the stop also positions the clamp to engage a new nut fragment in the unloading port of the hopper.
7. The nut is lowered (reverse of Step 4).
8. The nut is unclamped (reverse of Step 3), thus, allowing it to drop into the chute.

Before the nut insertion operation which follows, the upper and lower counterbores are cleaned by the brush tool (see Calfo) and the rotary cylinder is actuated to advance a new nut to the nut removal port.

The following operational steps are performed in the insertion in the upper counterbore of a new nut after the LGT is rotated 180° for the cleaning position:

1. While located in its "home" position, the clamp is rotated against the nut hopper. The adjustable preset stop which properly locates the jaws of the clamp with respect tot he nut fragment in the guide tube, also locates these jaws with respect to the new nut in the hopper.
2. Clamps the new nut.
3. lifts the new nut from the hopper.
4. Rotates back to home position (reverse of Step 1).
5. Moves toward LGT (Step 1 of nut removal).
6. Rotates 90° to position the new nut above the LGT upper counterbore (Step 2 of nut removal).
7. Lowers the nut into the counterbore (reverse of Step 3).
8. Unclamps the nut (reverse of Step 2).
9. Rotates back 90° (reverse of Step 6).
10. Returns to "home" position (reverse of Step 5).

Among the advantages of the pick-and-put tool are the following:

1. By changing the sequence of operations, the tool can perform the two required operations.
2. The tool is capable of being operated automatically when coupled with a programmable computer (see Calfo).
3. The tool is capable of operating manually and when operated in a manual mode, the tool can correct undesired abnormalities which may arise during the course of operation.
4. The tool is capable of being aligned prior to its disposition in the pool.
5. The tool can be operated remotely when submerged in the borated water of a reactor pool.
6. The tool is composed of stainless steel and is resistant to the borated water.

Once the new nut is positioned in the upper counterbore, the replacement of the old split-pin assembly by the new split-pin assembly is completed by the pin-insertion/torque tool as described in Calfo.

BRIEF DESCRIPTION OF THE DRAWINGS

For a better understanding of the invention, both as to its organizaton and as to its method of operation, together with additional objects and advantages thereof, reference is made to the following description, taken in connection with the accompanying drawings, in which:

FIG. 2 is a view in side elevation of a new split pin;

FIG. 3 is a plan view of a new nut;

FIG. 4 is a view in longitudinal section taken along line IV—IV of FIG. 3 but also showing the body portion of the new split pin threaded into the nut and a fragment of the flange at the LGT;

FIG. 9 is a view in end elevation and partly in section taken in the direction IX of FIG. 7 (See also FIG. 8);

FIG. 11 is a plan view showing the relationship to each other of the pick-and-put tool, the LGT and the nut hopper;

DETAILED DESCRIPTION OF THE EMBODIMENT

Figure 1:
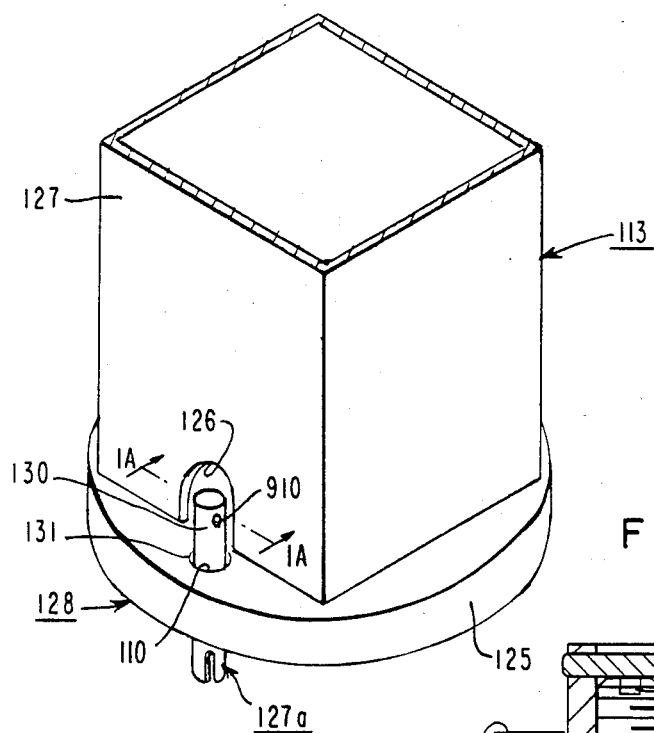
FIG. 1 is a fragmental view in isometric of an LGT whose split-pin assemblies are replaced in the practice of this invention.
Figure 1A:
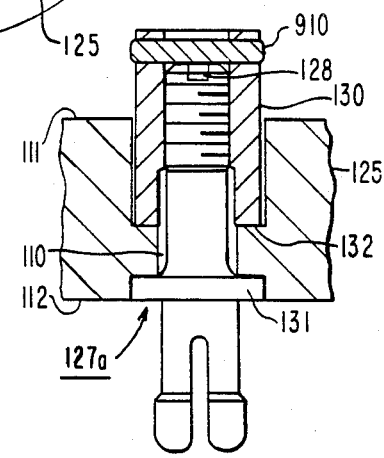
FIG. 1A is a view in section taken along line IA—IA of FIG. 1 but with the split pin not sectioned.

FIG. 1 shows the bottom end of a lower guide tube (LGT) 115 and FIG. 1A is a cross-sectional view of an old split-pin assembly mounted in the guide tube flange. The LGT is of generally square cross section having flat vertical walls 127. A circular flange 125 is welded to the lower end of the walls. Two 180°-spaced-through holes 110, counterbored on both the top 111 and bottom 112, are provided in the flange 125 for mounting the split-pin assemblies (only one is shown in FIG. 1). Directly above each hole there is an opening 126 (referred to as a "mousehole" because of its shape) in the wall which allows room for installation of the nut 130 of each split-pin assembly. Since the nut is partially inside the "mousehole" 126, access to the nut is limited to the region external to the "mousehole". The mounting of the split-pin assembly on the flange 125 consists of inserting the pin 127 up through the hole. The nut 130 threaded onto the pin and is torqued to firmly seat the pin flange 131 (FIG. 1A) and the end 132 of the nut on the shoulders formed by the respective counterbores in the flange 125. A button 128 is then inserted into a keyway on the top of the pin and a round bar 910 is inserted through holes spaced radially by 180° in the cap in order to lock the pin to the nut.

Figure 5:
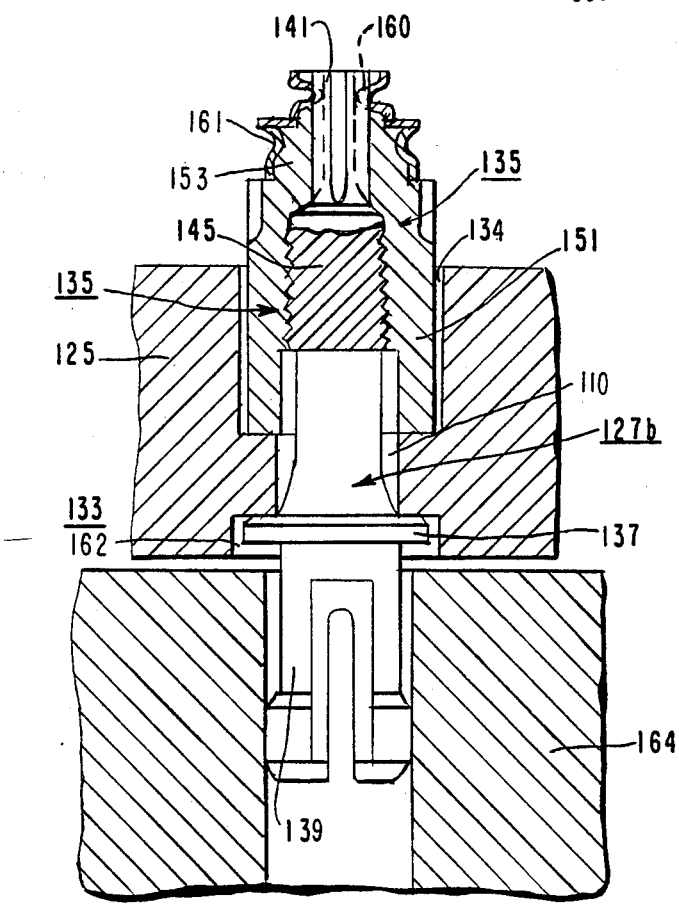
FIG. 5 is a view in longitudinal section showing a new split-pin assembly installed in an LGT with the lower path of the new split pin not sectioned.

The old split-pin assembly (FIGS. 1, 1A) is, in the practice of this invention, replaced by a new split-pin assembly (FIG. 5). Like the old assembly the new assembly 133 (FIG. 5) Land includes a split pin 127b and a nut 135 (FIGS. 4, 5). The new split pin 127b (FIG. 2) has a flange 137. Tines or leaves 139 extend integrally from one face of this flange and a shank extends integrally from the opposite side. The shank terminates in a step 141 having grooves or flutes 143 whose axial center lines are spaced peripherally by 90° so that there are four grooves in each stem 141. Between the stem and the flange 137, the shank has a threaded section 145.

The new nut 135 (FIGS. 3, 4) includes an annular central section 151 which has an internal thread dimensioned to mesh with the thread on section 145 of the split pin 127b. A skirt 152 extends from section 151 at one end and a collar 153 at the opposite end. Below the collar 153, the nut has splines 154 along a portion of its length. The collar 153 has a plurality of holes 155 in its surface. The center of the holes are spaced by 90° peripherally. A locking cap 157 is secured in the holes 155. The locking cap 157 has a pedestal 159 from which a tubular portion 160 extends. The locking cap is positioned over the collar 153 with the lower surface of the top of the pedestal 159 in engagement with the top of the collar. The peripheral surface of the pedestal is crimped at positions outwardly of the holes 155. The crimped surfaces 161 have the shape of the frustum of a cone and are reentrant into the holes. The crimping is such that the pedestal 159 grips the collar tightly so as to preclude rotation of the locking cap 157 relative to the collar 153 even if very high torques are impressed between the body of the nut 135 and the locking cap 157. FIGS. 3 and 4 show the nut 135 as it is fabricated.

FIG. 5 shows a new split-pin assembly 133 as it is secured in the flange 125. The nut 135 is seated in the upper counterbore 134 and the flange 137 of the split pin 127b extends into the lower counterbore 162. The tines 139 of the split-pin 127b resiliently engage the wall of a hole in the upper core plate 164 of the reactor. The tubular part 160 of the locking cap 157 is crimped in grooves 143 of the stem 141 of the new split pin 127b. The part 160 is crimped into only two opposite grooves 143 of each new split pin. For one split pin the part 160 is crimped into grooves generally coextensive with the apexes of the tine surfaces; in the other case the part is crimped into grooves centered along the center plane between the tines 139.

The phase of the replacement of the old split-pin assemblies by new assemblies involved in this invention will now be described. This phase is carried out with the pick-and-put tool 215 (FIGS. 6–10), the new-nut hopper 218 (FIGS. 11–14) and the pin-insertion/torque tool 219 (FIGS. 15–25).

As viewed from above the pool, the pick-and-put tool 215 (FIGS. 6–11) includes a vertical base plate 531 and a horizontal plate 533. These plates form an angular support, the horizontal plate 533 resembling a shelf. Guide rails 535 and 537 are mounted near the upper end of plate 531 and near the outer end of plate 533. A pillow block 539 and 541 (FIGS. 6, 9) is slideable along each rail. The pillow blocks 539 and 541 support a carriage 543 on which the mechanisms of the pick-and-put tool are mounted. The carriage 543 is movable along the rails 535 and 537 (horizontally) by a transport cylinder 545 through a yoke 547 (FIG. 8) and a drive bracket 548 (FIG. 9). The transport cylinder 545 is supported on plate 533. The inward and outward movements of the carriage 543 are limited by a stop assembly 549. This assembly 549 includes a horizontal bar 551 threaded at the outer end and having a collar 553 (FIG. 8) at the inner end. The "inner end" means the end towards the carriage 543; the "outer end" means the end away from the carriage. The bar 551 is threaded onto a bracket 555 secured to horizontal plate 533 and locked by nut 557. The position of the bar 551 on the bracket 555 is adjustable. Inwardly of the bracket 555, the bar 551 carries a nut 559 which is adjustably threaded along bar 551 and locked by nut 561. The inward movement of the carriage 543 is limited by the abutment of the collar 553 on the inner surface of a wall 563 of a box-like structure 565 on the carriage. The outward movement of the carriage 543 is limited by the abutment of the outer surface of wall 563 on nut 559 (FIG. 8). Typically, the carriage moves over a range of about 11 inches.

Figure 10:
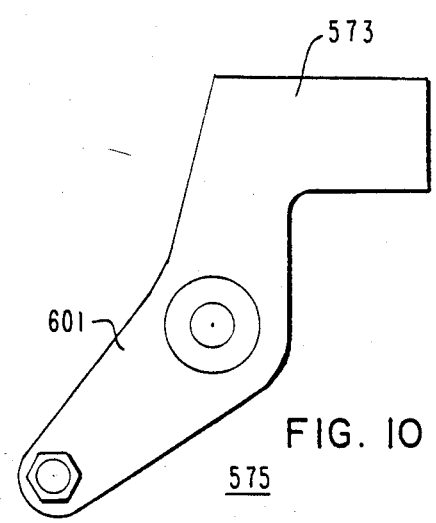
FIG. 10 is a plan view of the bell lever for pivoting the clamp of the pick-and-put tool.
Figure 13:
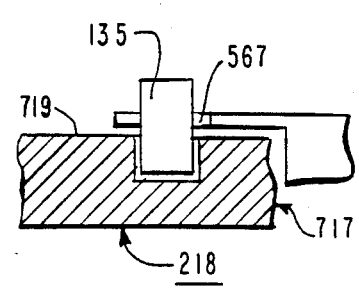
FIG. 13 is a fragmental view in transverse section taken along line XIII—XIII of FIG. 12.
Figure 6:
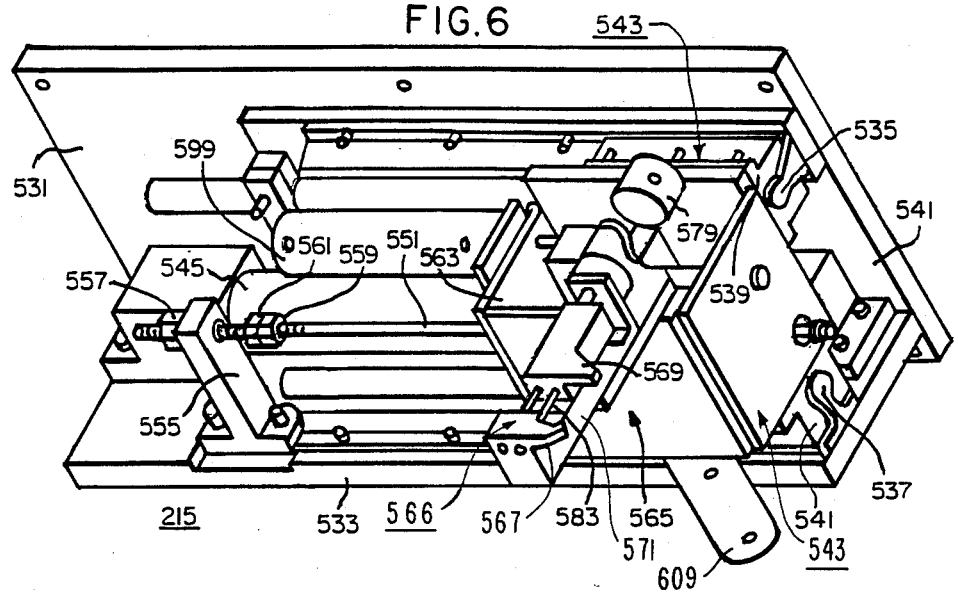
FIG. 6 is a simplified viw in isometric, with parts omitted in the interest of clarity, of the pick-and-put tool according to this invention.
Figure 7:
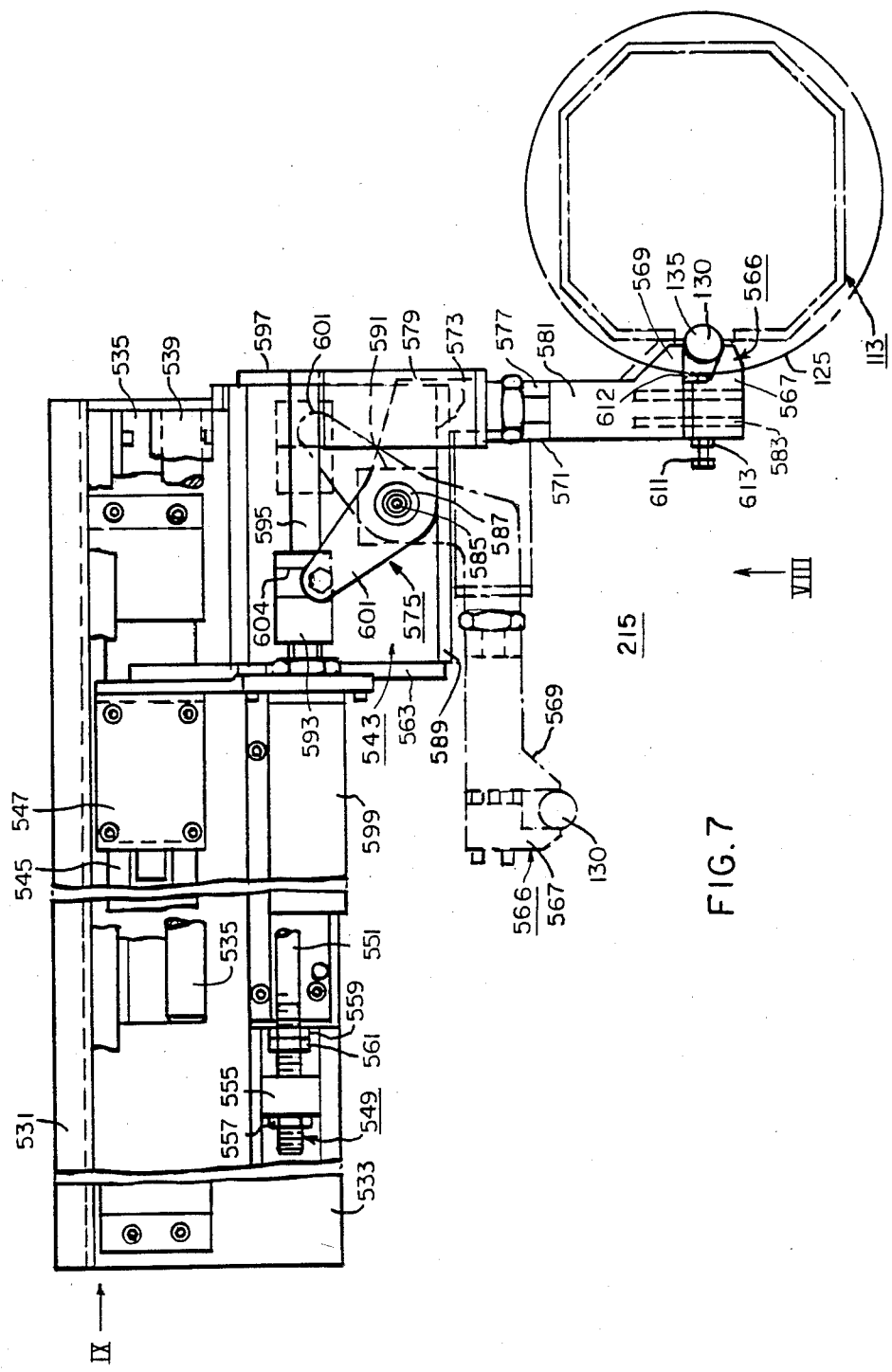
FIG. 7 is a plan view of the pick-and-put tool.
Figure 8:
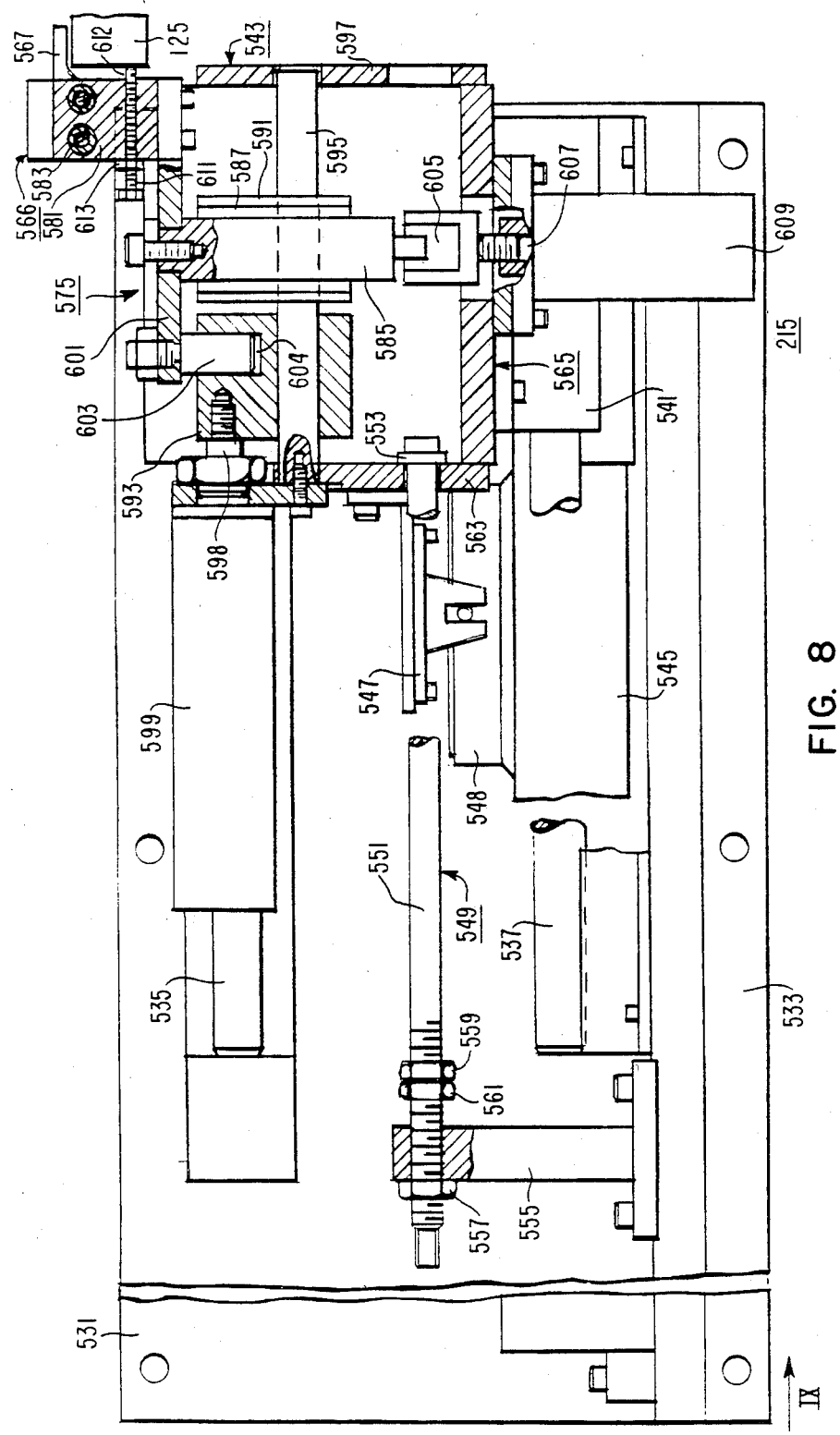
FIG. 8 is a view, slightly enlarged, in side elevation, and partly in section, taken in the direction VIII of FIG. 7.

The pick-and-put tool includes a clamp 566 having a fixed jaw 567 and a moveable jaw 569 (FIG. 7, 11). These jaws are closed to engage an old nut fragment to be removed or a new nut 135 (FIGS. 3, 4) to be installed. The fixed jaw 567 extends from an arm 571 which is mounted on the outer arm 573 of a pivotal bell lever 575 (FIGS. 10, 11). The moveable jaw 569 extends from a slide 581 which is slideable by the piston rod 577 of cylinder 579. The slide 581 carries pins 583 which are slideable in bushings in the arm of the fixed jaw 567, towards and away from the fixed jaw (FIG. 7). The bell lever 575 is bolted at its elbow to a pivot shaft 585 (FIG. 8) rotatable on a bearing 587 supported from a wall 589 of box structure 565 by a block 591 (FIG. 7). The bell lever 575 is pivoted by movement of guide 593 (FIGS. 7, 8) along guide bar 595 which is supported on wall 563 and the opposite wall 597 of the box-like structure 565. Guide 593 is slideable along guide bar 595 by the piston rod 598 of cylinder 599. Near its inner end, the inner arm 601 of lever 575 carries a slide 603 (FIG. 8) which slideably engages a slot 604 (FIG. 7) in guide 593 to pivot the lever horizontally towards and away from an LGT flange 125 or a hopper 218 as the guide 593 moves along guide bar 595 (FIG. 11). The "inner end" of lever 575 is defined as the end away from the jaws 565 and 567 and the "outer end" is defined as the end toward the jaws. Pivot shaft 585 (FIG. 8) is connected through a coupling 605 (FIG. 8) to the piston rod 607 of lift cylinder 609 which raises the bell lever 575 and the jaw assembly connected to it when it is necessary to clear walls of the flange 125 or of the hopper 218. The horizontal swing of the jaws 567 and 569, i.e., of the clamp, to the LGT 113 or to the hopper 218 (FIG. 11) is limited by a bolt 611 which is threaded into the fixed jaw 567 (FIGS. 7, 8). In the advanced or pivoted position the clamp 566 is stopped by the engagement of the end 612 of the bolt 611 with the LGT flange 125 in the outward position and with the hopper 218 in the inward position. The bolt 611 is locked in any position by a nut 613.

The clamp 566 is movable by cylinder 545 through yoke 547 (FIG. 8) between a first position identified herein as "home" position and a second position identified herein as "advanced position". In the "home position" the clamp 566 is set to be pivoted into engagement with a new nut 135 in hopper 218 (FIG. 11, broken lines). In the advanced position the clamp 566 is set to be pivoted into engagement with a fragment of an old split-pin assembly including nut 130 or to deposit a new nut 135 in position to be threaded onto a new split-pin 127(b) (FIGS. 7 and 11 full lines).

Figure 12:
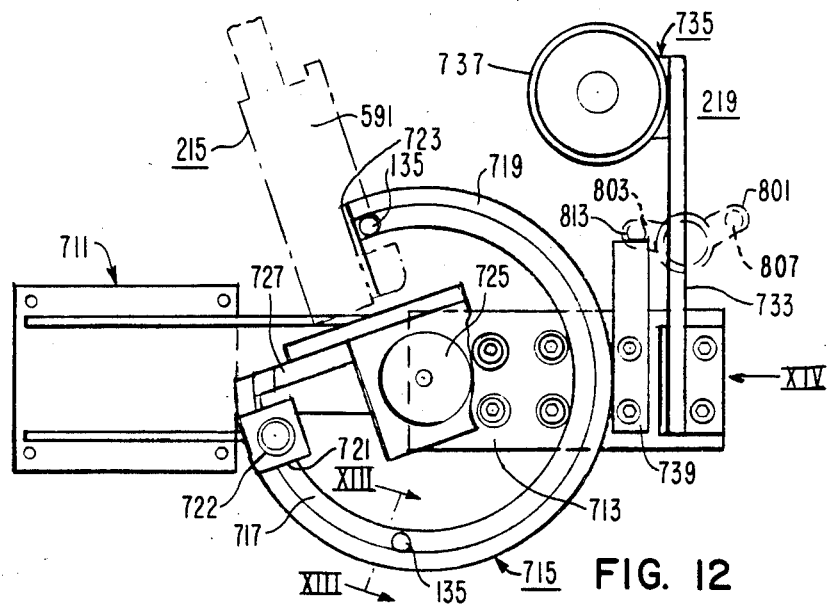
FIG. 12 is a plan view showing predominantly the nut hopper but also showing its position in relationship to the pin-insertion/torque tool.
Figure 14:
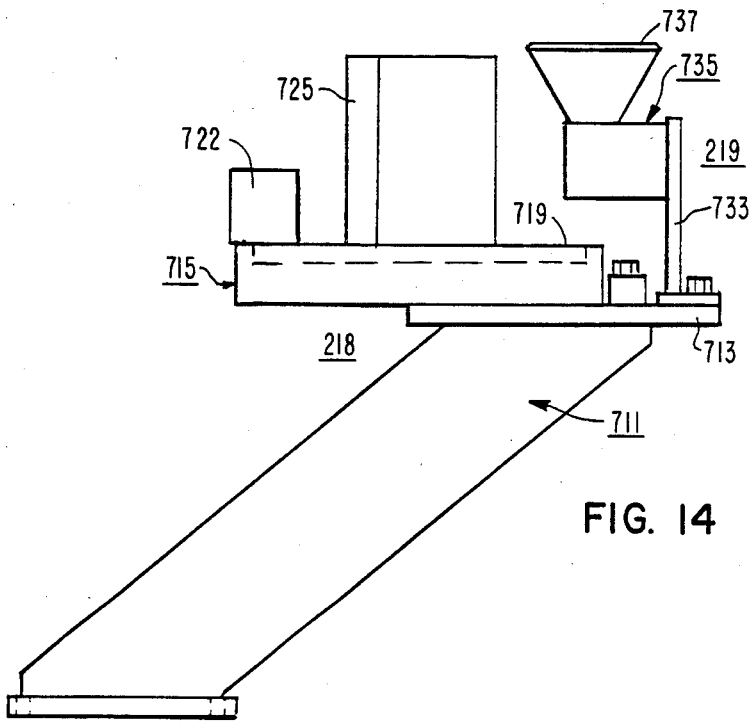
FIG. 14 is a view in side elevation taken in the direction XIV of FIG. 12.

FIG. 12 shows the new-nut hopper 218 in horizontal position as it would appear from above the pool. The nut hopper 218 is supported at an elevation where each new nut 135 (FIGS. 3, 4) is in position to be removed from the hopper 218 by the pick-and-put tool 215, by a bracket 711 (FIGS. 12, 14) which extends, from the bracket 712 (FIG. 16) that supports the pin-insertion/-torque tool 219. This elevation is also such that the new nut, when removed by the pick-and-put tool is properly positioned for insertion in the counterbore 134 (FIGS. 1, 5) of the flange 125 of the LGT. The bracket 711 carries a horizontal plate 713 at the top from which a horizontal circular plate 715 is supported. This plate extends over an angle of about 270° and has a grooved annulus 717, which may be described as a nut magazine. New nuts 135 are arrayed in the annulus. The nuts 135 in the groove 717 extent above the upper rim 719 (FIG. 13) of the groove so that they may be engaged by jaws 567 and 569 of the pick-and-put tool 215. Near an end the magazine 717 has a loading port 721. The loading port 721 has a funnel 722 (FIG. 12) to facilitate loading of nuts 135, one by one, in the magazine from above the pool through a long tube (not shown). At the opposite end the magazine 717 has a stop 723 which defines an unloading port. At this end each nut which abuts the stop 723 is in position to be removed by the pick-and-put tool 215. A rotary hydraulic cylinder 725 is supported from plate 713. This rotary cylinder 725 carries an arm 727 which when actuated by the cylinder advances nuts arrayed in the magazine 717 counterclockwise, as viewed with respect to FIG. 12, towards the stop 723 so that each nut in the array, in its turn, is in position to be removed by the pick-and-put tool 215. Typically about 24 nuts can be arrayed along the magazine 717. A switch (not shown) is embedded in the plate 713 near the stop 723 (see FIGS. 39-41 Calfo). The underside of the arm 727 has a bracket (not shown) on which a magnet (not shown) is supported (see Calfo). When the arm 727 swings to a position near the stop 723, this switch is actuated transmitting intelligence to the robotic control center on the deck that the hopper is empty.

The plate 713 extends beyond the circular plate 715 on the side opposite to the loading port 721. This plate carries a supporting plate 733 for the split-pin loading guide 735 of the pin-insertion/torque tool 219 and its funnel 737 (FIG. 16). The plate 713 also carries stop 739 for the wrench 741 of the pin-insertion/torque tool.

FIG. 16 shows the hopper and pin-insertion/torque tool as they would appear if viewed from a point directly over them above the pool, i.e., as they would appear if their outlines were projected on a horizontal plane. The components of the pin-insertion/torque tool 219, aside from the funnel 737, are mounted moveably on a vertical base plate 743. The base plate 743 is suspended from the edge of a horizontal trapezoidal-shaped plate 745 of the angle bracket 712 (FIGS. 15, 16). The angle bracket 712 is mounted on a cluster plate 747 which is in turn suspended from strong back 748 (FIG. 16). The actuating components of the pin-insertion/torque tool are mounted on a carriage 750 which is moveable on slides or pillow blocks 749 and 751 (FIG. 15) that are slideable horizontally on tracks 753 by transport cylinder 755 (FIG. 15). Stops 757 and 759 are provided; these stops engaged the pillow blocks 749 and 751 to limit the advance movement and the retract movement respectively of the components. In the advanced position 761 (FIG. 16), the wrench 741 is set to thread the nut 135 onto the threaded section 145 of the new split pin 127b (FIGS. 2, 3, 4, 19). In the storage position 762, the new pin 127b is loaded into the pin-insertion/torque tool 218.

While a preferred embodiment of this invention hs been disclosed herein, many modifications thereof are feasible. This invention is not be restricted except insofar as is necessitated by the spirit of the prior art.

We claim:

1. Apparatus for replacing an old split-pin assembly of a guide tube of a nuclear reactor with a new split-pin assembly, said old split-pin assembly including an old split pin and an old nut securing said old split-pin to said guide tube and said new split-pin assembly including a new split-pin and a new nut to secure said new split-pin to said guide tube in place of said old split-pin, said old split pin and said old nut being radioactive, the said guide tube to be positioned for said replacement submerged in a pool of water with a fragment of an old split-pin assembly in position to be replaced; the said apparatus including a hopper to have positioned therein a plurality of new nuts, said hopper having means, to engage said new nuts, for setting one of said new nuts in position to replace an old nut, said hopper being submerged in said pool of water, a pick-and-put tool, means mounting said pick-and-put tool submerged in said hopper on the other side thereof, said pick-and-put tool having a clamp and also having means, connected to said clamp, for moving said clamp back and forth between a first end position, and a first intermediate position and between a second end position and a second intermediate position, means connected to said clamp, for moving said clamp back and forth between said first and second intermediate positions, and means, connected to said clamp, for clamping said fragment of said old split-pin assembly in said first end position and for releasing said fragment in a disposal facility at a said intermediate position between said first end position and said second end position and for clamping said one new nut in said second end position and positioning said one new nut on said guide tube in position to secure a new pin to said guide tube in said first end position.

2. Apparatus for replacing an old split-pin assembly of a guide tube of a nuclear reactor with a new split-pin assembly, said old split-pin assembly including an old split pin and an old nut, said guide tube having a flange and said old nut securing said old split-pin in said flange, said new split-pin assembly including a new split pin and a new nut to secure said new split pin to said flange in place of said old split pin, said old split-pin assembly and said guide tube being radioactive, said old split-pin assembly having been severed into fragments, one of said fragments including a portion of said old nut and a portion of said old split-pin threaded to said old nut said one fragment being mounted in said guide tube, said guide tube being mounted submerged under a pool of water with said one nut fragment in a first end position; the said apparatus including a hopper for new nuts, and a pick-and-put tool, said hopper to contain a plurality of new nuts and including means, to be connected to said new nuts, for setting one of said new nuts at a second end position in position to be removed, said pick-and-put tool having an object clamping-and-transporting assembly and means, connected to said clamping-and-transporting assembly, for moving said clamping-and-transporting assembly back and forth, between a first intermediate location near said first end position and a second intermediate location near said second end position; said clamping-and-transporting assembly including:

(a) a clamp;
(b) actuating means, connected to said clamp and operable at both said first and second end positions, to actuate said clamp to engage or disengage an object, and
(c) means, connected to said clamp and actuating means also operable at both said first and second end positions, for transporting an object engaged by said clamp locally at each said first and second end positions from the corresponding object-engaging location to said intermediate corresponding first or second location;

the said apparatus also including means positioning, said pick-and-put tool and said hopper at generally the same operative vertical level, submerged in said pool of water, with the flange of a guide tube having mounted thereon and one fragment of a split-pin assembly to be replaced, with said pick-and-put tool having said flange on one side thereof with said one fragment in said first end position and said hopper on the other side thereof with said one new nut in said second end position and said object clamping-and-transporting assembly set so that it is moveable by said moving means and transportable by said clamping-and-transporting assembly between said first end position where said fragment is accessible for local clamping and transporting to the corresponding intermediate location, and said second end position where said one new nut is accessible for clamping, transporting to the corresponding second intermediate location and moving, by said moving means; whereby said clamp is transportable to a disposal facility for said fragment at a second intermediate location between said first end position and said second end position and also is transportable from said second end position to the corresponding intermediate location and thence to said flange to position a new nut in position to be threaded to a new split pin in said flange.

3. The apparatus of claim 2 wherein the clamping transporting assembly includes means, connected to the clamp for pivoting said clamp between the first intermediate location and clamping relationship with the one fragment in the first end positon and for pivoting said clamp between the second intermediate location nd clamping relationship with the one new nut in the second end position.

4. The apparatus of claim 3 wherein the pick-and-put tool includes first stop means for stopping the moving means in the first end position, said first stop means being preset so that the clamp is properly positioned to be brought into clamping relationship with the one fragment in said first end position; and second stop means for stopping the moving means in the second end position, said second stop means being preset so that the clamp is properly positioned to be brought into clamping relationship with the one new nut in said second end position.

5. The apparatus of claim 4 whereint he pick-and-put tool includes third stop means for stopping the pivoting means when the clamp is in clamping relationship with the one fragment and fourth stop means for stopping the pivoting of said pivoting means when the clamp is in clamping relationship with the one new nut.

6. The apparatus of claim 3 wherein the pick-and-put tool includes third stop means for stopping the pivoting means when the clamp is in clamping relationship with the one fragment and fourth stop means for stopping the pivoting of said pivoting means when the clamp is in clamping relationship with the one new nut.

7. Apparatus for replacing an old split-pin assembly of a guide tube of a nuclear reactor with a new split-pin assembly, said old split-pin assembly including an old split pin and an old nut securing said old split pin to said guide tube and said new split-pin assembly including a new split pin and a new nut to secure said new split pin to said guide tube in place of said old split pin, said old split pin and said old nut being radioactive, the said guide tube to be mounted for said replacement submerged in a pool of water with a fragment of an old split-pin assembly in position to be replaced; the said apparatus including a pick-and-put tool having a clamping-and-transporting assembly and means, connected to said clamping-and-transporting assembly, operable to move said clamping-and-transporting assembly back and forth between a first position and a second position, the said clamping-and-transporting assembly including (a) a clamp,
(b) actuating means, actuable at each said position, for operating, said clamp to clamp an object, and
(c) transporting means, operable at each said position, for transporting a clamped object locally between a clamping location and an intermediate location;

the said apparatus also including means for supplying new nuts, means, connected to said pick-and-put tool, for mounting said pick-and-put tool cooperatively with a guide tube, mounted as aforesaid, so that, in the first position of said pick-and-put tool, the clamp of said clamping-and transporting assembly is actuable by its actuating means at the corresponding clamping location to clamp said fragment and the transporting means of said clamping-and-transporting assembly is operable to transfer to a disposal facility at a said intermediate location between said first and second positions, the fragment in said guide tube of an old split-pin assembly to be replaced, and means mounting said new-nuts supplying means submerged in said pool cooperatively with said pick-and-put tool and said guide tube so that in said second position of said pick-and-put tool the clamp of said clamping-and-transporting assembly is actuable by its actuating means to clamp a new nut in said new-nut supplying means and the transporting means of said clamping-and-transporting assembly is operable to remove said clamped new nut from said new-nut supplying means and to transport said new nut to the corresponding intermediate location, and, said moving means, is operable to transport said new nut to the corresponding intermediate location at said first position and on reverse operation of said transporting means and reverse actuation of said actuating means at said second position to position said new nut in said guide tube for securing a new split pin.

8. The apparatus of claim 7 wherein the clamp and its actuating means are pivotally mounted and the transporting means operates by pivoting the clamp and its actuating means between the object- clamping locations and the intermediate locations and the moving means includes means for moving the clamping-and-transporting assembly linearly between the first and second positions.

* * * * *